US012650107B2

(12) United States Patent
Fimml et al.

(10) Patent No.: US 12,650,107 B2
(45) Date of Patent: Jun. 9, 2026

(54) PRECHAMBER ASSEMBLY

(71) Applicant: INNIO Jenbacher GmbH & Co OG, Jenbach (AT)

(72) Inventors: Wolfgang Fimml, Maurach in Tirol (AT); Guenther Waldner, Achenkirch (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/850,532

(22) PCT Filed: Mar. 24, 2022

(86) PCT No.: PCT/AT2022/060092
§ 371 (c)(1),
(2) Date: Sep. 24, 2024

(87) PCT Pub. No.: WO2023/178367
PCT Pub. Date: Sep. 28, 2023

(65) Prior Publication Data
US 2025/0207550 A1 Jun. 26, 2025

(51) Int. Cl.
*F02B 19/00* (2006.01)
*F02B 19/12* (2006.01)
*F02B 19/16* (2006.01)
*F02M 55/00* (2006.01)

(52) U.S. Cl.
CPC ........... *F02M 55/004* (2013.01); *F02B 19/12* (2013.01); *F02B 19/16* (2013.01)

(58) Field of Classification Search
CPC ........ F02B 19/108; F02B 19/18; F02B 53/10; F02P 13/00; F02D 41/3094; F02D 41/0027; F02M 21/0275
USPC .......................................................... 123/253
See application file for complete search history.

(56) References Cited

U.S. PATENT DOCUMENTS 5,662,082 A * 9/1997 Black ...................... F02B 19/16 29/888.01
10,837,355 B2 * 11/2020 Endo ...................... F02F 1/242
2002/0104507 A1 * 8/2002 Riggs ...................... F02B 19/16 123/266
2012/0103302 A1 * 5/2012 Attard ...................... F02B 19/10 123/260
2015/0068489 A1 * 3/2015 Bunce ...................... F02B 19/12 123/262
2017/0328274 A1 * 11/2017 Schulz .................. F01C 21/106
(Continued)

FOREIGN PATENT DOCUMENTS

DE 2606014 A1 8/1977
DE 102020003126 A1 11/2021
(Continued)

OTHER PUBLICATIONS

PCT International Search Report and Written Opinion; Application No. PCT/AT2022/060092; dated Nov. 23, 2022; 16 pages.

*Primary Examiner* — Hung Q Nguyen
*Assistant Examiner* — James J Kim
(74) *Attorney, Agent, or Firm* — Fletcher Yoder, P.C.

(57) ABSTRACT

A prechamber assembly for an internal combustion engine in which a sealing seat is formed between at least one first sleeve seat surface (12) of a prechamber sleeve (1) and at least one injector seat surface (11) of at least one fuel injector (4).

20 Claims, 4 Drawing Sheets

(56) References Cited

U.S. PATENT DOCUMENTS

| | | | | |
|---|---|---|---|---|
| 2019/0072025 | A1* | 3/2019 | Rabhi | F02B 19/18 |
| 2019/0085776 | A1* | 3/2019 | Tate, Jr. | F02M 21/0275 |

FOREIGN PATENT DOCUMENTS

| | | | |
|---|---|---|---|
| GB | 1535762 | A | 12/1978 |
| WO | 2020158263 | A1 | 8/2020 |

* cited by examiner

PRECHAMBER ASSEMBLY

CROSS-REFERENCE TO RELATED APPLICATION

This application is a National Stage entry from, and claims benefit of, PCT Application No. PCT/AT2022/060092, filed on Mar. 24, 2022, entitled "PRECHAMBER ASSEMBLY", which is herein incorporated by reference in its entirety.

BACKGROUND

The invention is in the field of a prechamber assembly for an internal combustion engine.

WO 2020 158 263 A1 shows a prechamber used to ignite an air-fuel mixture in a main combustion chamber. In order to reduce the emissions of the internal combustion engine during engine start, a prechamber heating operations is performed by injecting a predetermined amount of fuel into the prechamber by way of a fuel injector and igniting an air-fuel-mixture therein using a spark plug, while a main fuel injector is deactivated during at least a first engine cycle after engine start request.

It is problematic to achieve sufficient sealing of the prechamber arrangement, especially if there are concerns with space requirement, in particular, if it is intended to provide all the fuel necessary for the working of the internal combustion engine via the prechamber assembly.

BRIEF DESCRIPTION

It is an aspect of certain embodiments of the invention to provide a prechamber assembly for an internal combustion engine with improved sealing such that the prechamber assembly has reduced space requirement.

Still other aspects and advantages of certain embodiments of the invention will in part be apparent from the specification and drawings.

One aspect of the disclosure relates to a prechamber assembly for an internal combustion engine, comprising:

- an elongated prechamber sleeve having
  - an axis of elongation
  - at least one first opening for partially inserting at least one fuel injector, for injection of hydrogen, the at least one first opening being surrounded by at least one first sleeve seat surface
  - at least one second opening for at least one ignition device
  - preferably, a third opening for contacting a riser channel
  - at least one prechamber volume connected to the aforementioned openings
- at least one fuel injector for injecting fuel into the at least one prechamber volume, the at least one fuel injector being arranged at least substantially parallel (preferably parallel) to the axis of elongation and having at least one injector seat surface
- at least one ignition device for igniting a fuel-air-mixture inside the at least one prechamber volume, the at least one ignition device protruding into the at least one second opening and having an elongated shape and a device axis which forms an acute angle with the axis of elongation (preferably in a range of 30° to 90° measured from the device axis)

wherein a sealing seat is formed between the at least one first sleeve seat surface and the at least one injector seat surface Because the at least one fuel injector is arranged at least substantially parallel to the axis of elongation and has at least one injector seat surface and the prechamber sleeve has at least one corresponding first sleeve seat surface, it is possible to achieve sealing between the at least one fuel injector and the prechamber sleeve by applying pressure along the axis of elongation on the at least one fuel injector. This pressure can be applied when the at least one fuel injector is mounted to the cylinder head, such that the at least one injector seat surface presses against the at least one first sleeve seat surface. In this way, a metallic sealing edge is formed between the at least one fuel injector and the prechamber sleeve.

The arrangement of the at least one fuel injector at least substantially parallel, and preferably parallel, to the axis of elongation leaves more space compared to the prior art and allows the use of a fuel injector by which all the fuel necessary for the working of the internal combustion engine can be provided via the prechamber assembly.

In case the prechamber sleeve is of substantially cylindrical shape (with circular or elliptical cross-section), then the axis of elongation is the cylinder axis.

It should be noted that the at least one second opening of the prechamber sleeve provides enough clearance for the at least one injection device not to hinder the slight movements of the parts in connection with the appliance of the pressure via the at least one fuel injector.

Preferred embodiments of the invention are described in dependent claims.

It is possible that the prechamber sleeve comprises a prechamber which also encompasses a riser channel.

It is possible that the at least one fuel injector and the prechamber sleeve are braced against each other.

In a preferred embodiment, the prechamber assembly comprises a riser channel sleeve in which at least one riser channel is arranged, the riser channel sleeve having at least one first channel seat surface and the at least one third opening having at least one second sleeve seat surface, wherein a (metallic) sealing seat is formed between the at least one first channel seat surface and the at least one second sleeve seat surface. Due to the at least one fuel injector being mounted to the cylinder head, the at least one second sleeve seat surface presses against the at least one first channel seat surface.

In a preferred embodiment, the at least one second opening has at least one third sleeve seat surface and the at least one ignition device has at least one igniter seat surface, wherein a sealing seat is formed between the at least one igniter seat surface and the at least one third sleeve seat surface (front-sealed ignition device). This arrangement needs less space than the standard sealing arrangement using a seal arranged farther away from the prechamber sleeve (in case a spark plug is used, usually on the far side of the spark plug thread).

In these embodiments, it is preferred that the at least one ignition device comprises a spark plug arranged in a spark plug sleeve and the at least one igniter seat surface is arranged on the spark plug sleeve.

Alternatively, or in addition, it can also be provided in these embodiments that the front-sealed ignition device can be fastened (preferably screwed) laterally into the prechamber sleeve. It might be advantageous to strengthen the prechamber in this region in direction towards the prechamber volume, such that a wall strength of the prechamber sleeve is increased with respect to other regions.

It is preferred, that a middle of a front surface of the at least one ignition device is positioned in a distance of about 0-50%, preferably of about 10-35% of a diameter of the at least one ignition device in front of an axis of elongation of the at least one fuel injector (measured in a direction orthogonal to the axis of elongation of the at least one fuel injector).

In a preferred embodiment, there is only one fuel injector present in the prechamber assembly.

In some embodiments, fuel can be injected by the at least one fuel injector with a pressure between 30 bar and 50 bar.

In a preferred embodiment of the prechamber assembly, the following sealing seats are formed when an axial force is exerted onto the at least one fuel injector during mounting of the at least one fuel injector to the at least one cylinder head surface:

- between the at least one fuel injector and the prechamber sleeve (between the at least one first sleeve seat surface and the at least one injector seat surface)
- between the riser channel sleeve and the prechamber sleeve (between the at least one first channel seat surface and the at least one second sleeve seat surface)
- between the at least one ignition device and the prechamber sleeve (between the at least one igniter seat surface and the at least one third sleeve seat surface)

In some embodiments, it is provided that

- the at least one first opening is arranged on a front surface, and/or
- the at least one second opening is arranged on a lateral surface, and/or
- the at least one third opening is arranged on a front surface of the elongated prechamber sleeve In some embodiments, it is provided that the prechamber volume has, along the axis of elongation, a first cross section and a second cross section of different sizes, the cross section of larger size being arranged at the height of the at least one ignition device. The reason for this is to achieve a lower flow velocity of the injected fuel in the region of the at least one ignition device.

In these embodiments, it is preferred that a diameter of the prechamber volume is larger at an ignition gap (in particular, or electrode gap) of the at least one ignition device (in particular, a spark gap of a spark plug) than a diameter of the prechamber at the point of injection of the at least one fuel injector. In this way, the flow rate of the fuel injected by the at least one fuel injector is reduced at the ignition gap.

Although the prechamber assembly according to certain embodiments of the invention can be used with any type of engine, it is preferred that it is used in an internal combustion engine having at least one piston-cylinder-unit, preferably at least 10 piston-cylinder-units.

Although the prechamber assembly according to certain embodiments of the invention can be used with any type of engine, it is preferred that it is used in an internal combustion engine that can be coupled with an electric generator to form a genset for the production of electric energy.

Although the prechamber assembly according to certain embodiments of the invention can be used with any type of engine, it is preferred that it is used in a stationary internal combustion engine.

It is to be understood that the features of the preceding paragraphs can be used in isolation or combined in any way.

BRIEF DESCRIPTION OF THE DRAWINGS

Embodiments of the invention are discussed making use of the enclosed figures.

DETAILED DESCRIPTION

Figure 1:
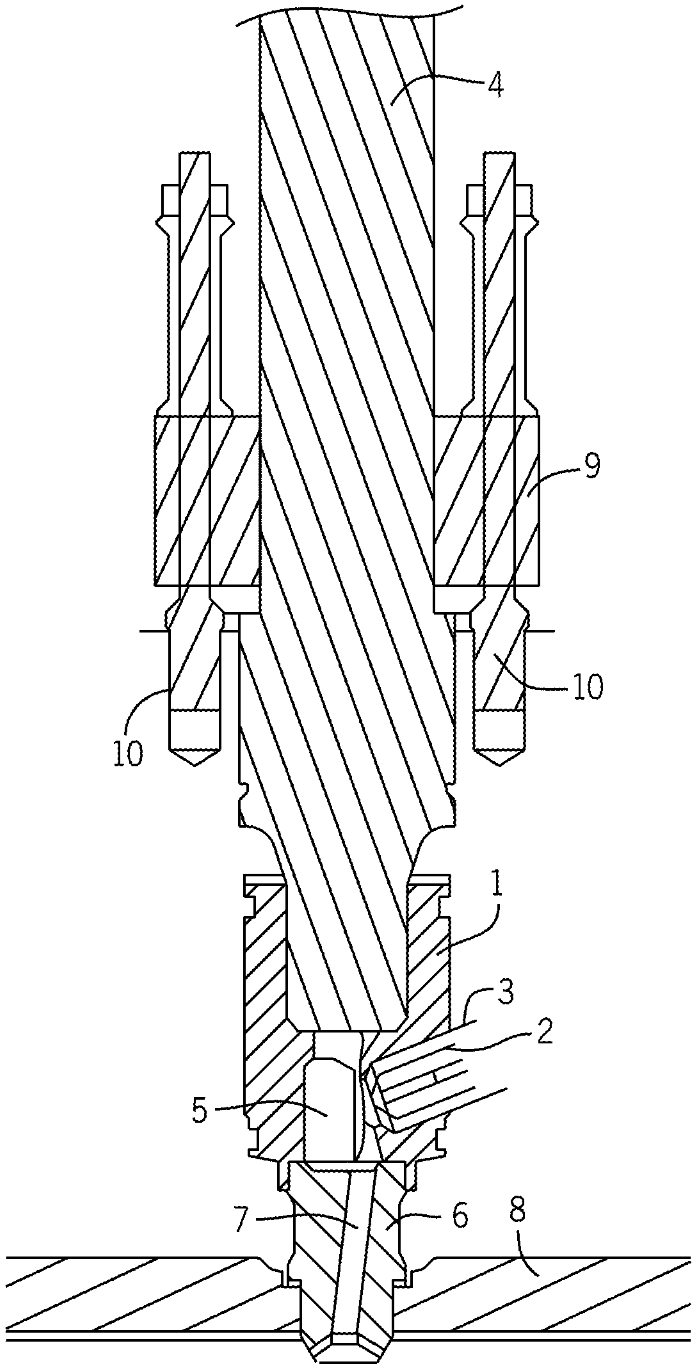
FIG. 1 shows a cut section drawing along a medial plane of the prechamber assembly in a state mounted to a cylinder head of an internal combustion engine.
Figure 2:
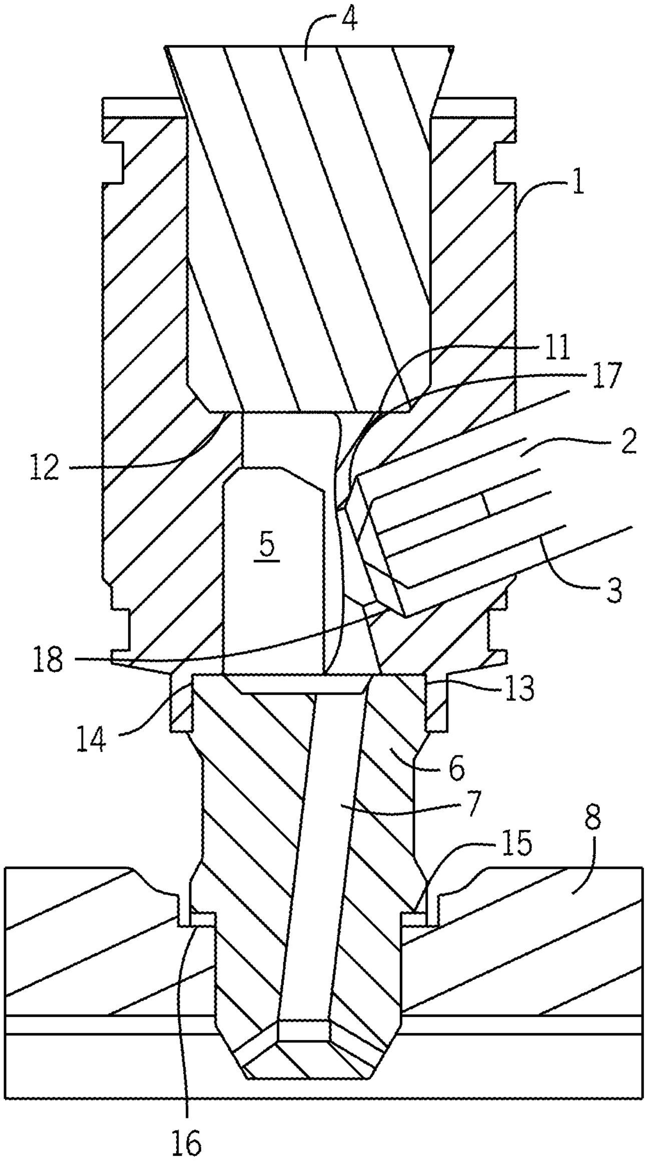
FIG. 2 shows a detail of FIG. 1 in an enlarged presentation.

In FIG. 1, it is shown that the fuel injector 4 is mounted, in this example by way of bolts 10, to the cylinder head 8. It is important that the fuel injector 4 is pressed by the bolts 10 against the cylinder head 8. Due to this force, a seal is achieved (cf. FIG. 2):

- between the fuel injector 4 and the prechamber sleeve 1 (between the first sleeve seat surface 12 and the at least one injector seat surface 11)
- between the riser channel sleeve 6 and the prechamber sleeve 1 (between the at least one first channel seat surface 13 and the at least one second sleeve seat surface 14)
- between the at least one ignition device and the prechamber sleeve 1 (between the at least one igniter seat surface 17 and the at least one third sleeve seat surface 18)

It should be noted that the sealing ring visible on a lateral surface of the prechamber sleeve 1 is not necessary to achieve sealing, but the sealing ring is used only to stabilize the prechamber sleeve 1 during assembly. The seal is achieved by metallic contact on the front surfaces of the parts.

Figure 3:
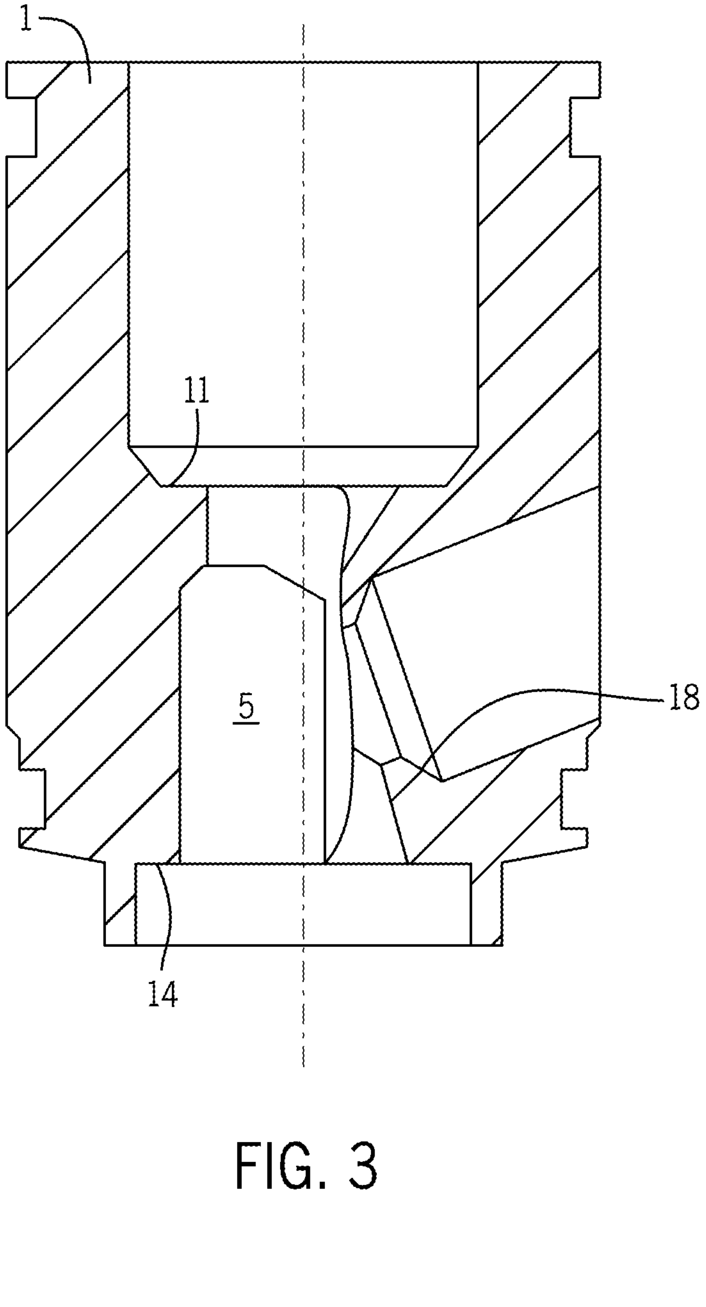
FIG. 3 shows a prechamber sleeve of a prechamber assembly of FIG. 1.

FIG. 3 shows the prechamber sleeve 1 in isolation.

Figure 4:
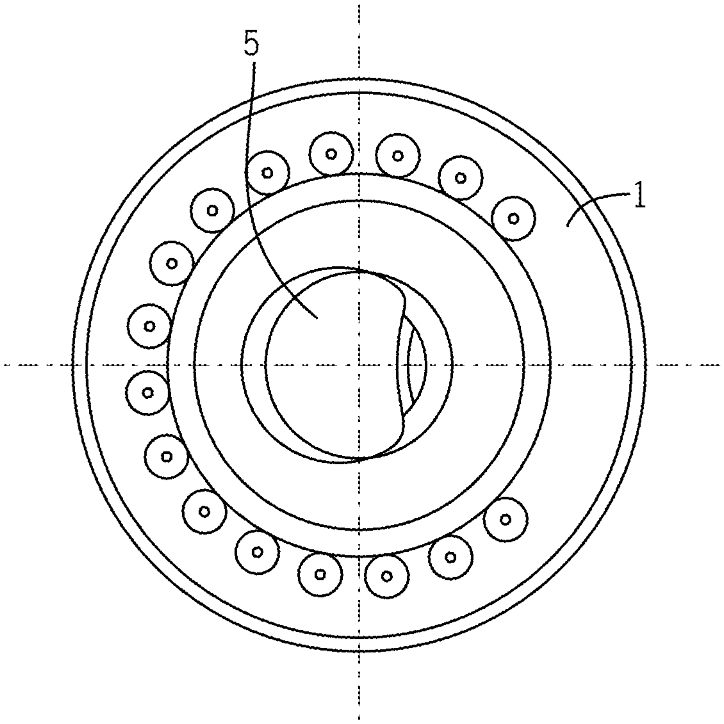
FIG. 4 shows a view along the axis of elongation of the prechamber assembly of FIG. 1 viewed from a main combustion chamber of the internal combustion engine.

In FIG. 4, the openings of the riser channel 7 into a main combustion chamber can be seen.

LIST OF REFERENCE

1 prechamber sleeve
2 spark plug
3 spark plug sleeve
4 fuel injector
5 prechamber volume
6 riser channel sleeve
7 riser channel
8 cylinder head
9 mounting sleeve
10 bolt
11 injector seat surface
12 first sleeve seat surface
13 first channel seat surface
14 second sleeve seat surface
15 second channel seat surface
16 cylinder head surface
17 igniter seat surface
18 third sleeve seat surface

The invention claimed is:

1. A system, comprising:

a prechamber assembly for an internal combustion engine, comprising:

an elongated prechamber sleeve, comprising:

an axis of elongation;

at least one first opening configured to receive at least one fuel injector, for injection of hydrogen, the at least one first opening being surrounded by at least one first sleeve seat surface;

at least one second opening configured to receive at least one igniter;

at least one third opening having at least one second sleeve seat surface configured to contact and seal with at least one first channel seat surface of a riser channel sleeve;

at least one prechamber volume connected to the at least one first opening, the at least one second opening, and the at least one third opening:

at least one fuel injector configured to inject fuel into the at least one prechamber volume, the at least one fuel injector being arranged at least substantially parallel to the axis of elongation and having at least one injector seat surface configured to press against and seal with the at least one first sleeve seat surface;

the at least one igniter configured to ignite a fuel-air-mixture inside the at least one prechamber volume, the at least one igniter protruding into the at least one second opening and having a substantially cylindrical shape and a device axis which forms an acute angle with the axis of elongation;

the riser channel sleeve having at least one riser channel, wherein the riser channel sleeve has at least one second channel seat surface configured to contact at least one cylinder head surface of a cylinder head;

wherein the at least one second sleeve seat surface is configured to press against the at least one first channel seat surface due to the at least one fuel injector being mounted to the cylinder head; and wherein the at least one second channel seat surface is configured to press against the at least one cylinder head surface due to the at least one fuel injector being mounted to the cylinder head.

2. The system of claim 1, wherein the at least one second opening has at least one third sleeve seat surface and a front portion of the at least one igniter has at least one igniter seat surface, wherein the at least one igniter seat surface is configured to seal with the at least one third sleeve seat surface such.

3. The system of claim 2, wherein the at least one igniter comprises a spark plug arranged in a spark plug sleeve and the at least one igniter seat surface is arranged on the spark plug sleeve.

4. The system of claim 1, wherein the at least one first opening is arranged on a front surface; and/or the at least one second opening is arranged on a lateral surface; and/or the at least one third opening is arranged on a surface opposite the front surface of the elongated prechamber sleeve.

5. The system of claim 1, wherein the at least one prechamber volume has, along the axis of elongation, a first cross section and a second cross section of different sizes, the cross section of larger size being arranged at a cylinder height of the at least one igniter.

6. The system of claim 1, wherein the at least one first opening for the at least one fuel injector is coaxial with the axis of elongation, the at least one second opening for the at least one igniter is disposed in a side wall of the elongated prechamber sleeve, and the at least one prechamber volume is asymmetric relative to the axis of elongation.

7. The system of claim 6, wherein the at least one prechamber volume has a first radial distance from the axis of elongation to a first interior side having the at least one second opening, the at least one prechamber volume has a second radial distance from the axis of elongation to a second interior side opposite from the first interior side, and the first radial distance is less than the second radial distance.

8. The system of claim 1, further comprising the cylinder head, wherein, due to the at least one fuel injector being mounted to the cylinder head, the at least one second sleeve seat surface presses against the at least one first channel seat surface and the at least one second channel seat surface presses against the at least one cylinder head surface.

9. The system of claim 8, further comprising the internal combustion engine having the cylinder head.

10. The system of claim 9, wherein the at least one fuel injector of a piston-cylinder-unit is configured to inject 100% of the fuel comprising the hydrogen, provided to that piston-cylinder-unit per combustion cycle.

11. A system, comprising:

a prechamber assembly of an internal combustion engine, wherein the prechamber assembly comprises:

a body forming a prechamber volume;

a first opening in the body fluidly coupled to the prechamber volume, wherein the first opening is along a central axis of the body, and the first opening is configured to receive a fuel injector;

a second opening in the body fluidly coupled to the prechamber volume, wherein the second opening is configured to receive an igniter, and the second opening is oriented at an acute angle relative to the central axis; and a third opening in the body fluidly coupled to the prechamber volume, wherein the third opening is configured to fluidly couple to a riser channel of a riser;

wherein the body is configured to press against the riser to seat the riser with the third opening due to the fuel injector being mounted to a cylinder head; and wherein the body is configured to press the riser against the cylinder head to seat the riser with the cylinder head due to the fuel injector being mounted to the cylinder head.

12. The system of claim 11, wherein the second opening is axially between the first and third openings.

13. The system of claim 12, wherein the first and third openings are disposed on axially opposite ends of the body, and the second opening is disposed in a side wall of the body.

14. The system of claim 13, wherein the prechamber volume is asymmetric relative to the central axis, the prechamber volume has a first radial distance from the central axis to a first interior side having the second opening, the prechamber volume has a second radial distance from the central axis to a second interior side opposite from the first interior side, and the first radial distance is less than the second radial distance.

15. The system of claim 14, wherein the riser channel is oriented at another acute angle relative to the central axis, the riser channel is radially between the central axis and the second opening at an interface between the riser and the third opening, and the riser channel is angled toward the second opening for the igniter.

16. The system of claim 11, comprising the riser having one or more openings along a tip portion of the riser, and the tip portion of the riser is configured to protrude into a main combustion chamber of the internal combustion engine.

17. The system of claim 11, comprising the cylinder head, the internal combustion engine, or a combination thereof, having the prechamber assembly.

18. The system of claim 14, wherein the first opening for the fuel injector is coaxial with the central axis of the body.

19. A method, comprising:

injecting a fuel into a prechamber volume of a body of a prechamber assembly of an internal combustion engine via a fuel injector, wherein the fuel injector is disposed in a first opening in the body along a central axis of the body;

igniting the fuel in the prechamber volume via an igniter, wherein the igniter is disposed in a second opening in the body oriented at an acute angle relative to the central axis; and channeling through a riser channel of a riser between the prechamber volume and a main combustion chamber of the internal combustion engine, wherein the riser is disposed in a third opening in the body;

wherein the body presses against the riser to seat the riser with the third opening due to the fuel injector being mounted to a cylinder head; and wherein the body presses the riser against the cylinder head to seat the riser with the cylinder head due to the fuel injector being mounted to the cylinder head.

20. The method of claim 19, wherein the first opening for the fuel injector is coaxial with the central axis, the second opening for the igniter is disposed in a side wall of the body, the prechamber volume is asymmetric relative to the central axis, the prechamber volume has a first radial distance from the central axis to a first interior side having the second opening, the prechamber volume has a second radial distance from the central axis to a second interior side opposite from the first interior side, and the first radial distance is less than the second radial distance.

* * * * *